United States Patent
Yonezawa et al.

(10) Patent No.: US 9,893,629 B2
(45) Date of Patent: Feb. 13, 2018

(54) CONTROL METHOD FOR SWITCHING POWER SUPPLY CIRCUIT AND POWER SUPPLY DEVICE

(71) Applicant: FUJITSU LIMITED, Kawasaki-shi, Kanagawa (JP)

(72) Inventors: Yu Yonezawa, Sagamihara (JP); Tomotake Sasaki, Kawasaki (JP); Hisato Hosoyama, Yokohama (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/274,720

(22) Filed: Sep. 23, 2016

(65) Prior Publication Data

US 2017/0099003 A1 Apr. 6, 2017

(30) Foreign Application Priority Data

Oct. 2, 2015 (JP) .................. 2015-196561

(51) Int. Cl.
 *H02M 3/335* (2006.01)
 *H02M 1/08* (2006.01)
 *H02M 1/00* (2006.01)

(52) U.S. Cl.
 CPC ......... *H02M 3/33507* (2013.01); *H02M 1/08* (2013.01); *H02M 2001/0009* (2013.01)

(58) Field of Classification Search
 CPC .... H02M 3/335; H02M 3/33507; H02M 1/08; H02M 2001/0009; H02M 2007/4815; H02M 3/33538; H02M 3/33546; H02M 3/33515; H02M 3/315; H02M 7/515; H02H 7/122; H02H 1/32

USPC .. 363/20, 21.01, 21.02, 21.04, 21.05, 21.09, 363/21.12, 21.13, 21.17, 55, 56.01, 56.03, 363/56.09, 56.1, 95, 97
See application file for complete search history.

(56) References Cited

U.S. PATENT DOCUMENTS

| | | | | |
|---|---|---|---|---|
| 4,438,311 | A * | 3/1984 | Tazima | H05B 6/062 219/626 |
| 4,634,932 | A * | 1/1987 | Nilssen | H05B 41/2856 315/119 |
| 2006/0168832 | A1* | 8/2006 | Yasui | G01C 17/38 33/356 |

(Continued)

FOREIGN PATENT DOCUMENTS

| JP | 2008-113476 A | 5/2008 |
|---|---|---|
| JP | 2012-90406 A | 5/2012 |
| JP | 2014-119354 A | 6/2014 |

*Primary Examiner* — Adolf Berhane
(74) *Attorney, Agent, or Firm* — Fujitsu Patent Center

(57) ABSTRACT

A control method for a switching power supply circuit, the control method causing a processor to execute a process, the process includes: calculating a differential value between an output voltage of the switching power supply circuit and a target voltage; multiplying the differential value by a first coefficient to calculate a correction value; correcting a first detection value of an output current of the switching power supply circuit, which is detected by a current transformer circuit, based on the correction value, to generate a second detection value; comparing the second detection value with a threshold current value to determine whether or not an overcurrent has occurred; and reducing, when it is determined that the overcurrent has occurred, the output voltage of the switching power supply circuit.

5 Claims, 12 Drawing Sheets

(56) References Cited

U.S. PATENT DOCUMENTS

| | | |
|---|---|---|
| 2012/0092896 A1 | 4/2012 | Hachiya et al. |
| 2012/0163046 A1* | 6/2012 | Hibino .............. H02M 7/53875 363/37 |
| 2013/0258731 A1* | 10/2013 | Xu .......................... H02M 1/08 363/78 |
| 2015/0035510 A1* | 2/2015 | Hoshino ............... H02M 3/157 323/283 |
| 2015/0381061 A1* | 12/2015 | Yan ................... H02M 3/33546 363/21.02 |
| 2017/0126135 A1* | 5/2017 | Sugawara ............... H02M 1/08 |
| 2017/0201184 A1* | 7/2017 | Yonezawa ............... H02M 1/32 |

* cited by examiner

CONTROL METHOD FOR SWITCHING POWER SUPPLY CIRCUIT AND POWER SUPPLY DEVICE

CROSS-REFERENCE TO RELATED APPLICATION

This application is based upon and, claims the benefit of priority of the prior Japanese Patent Application No. 2015496561, filed on Oct. 2, 2015, the entire contents of which are incorporated herein by reference.

FIELD

The embodiments discussed herein are related to a control method for a switching power supply circuit and a power supply device.

BACKGROUND

Conventionally, when an output current of a power supply device including a switching power supply circuit is equal to or larger than a rated current, in order not to damage the power supply device and a load coupled to the power supply device, control to reduce an output voltage of the power supply device is performed. The control is called drop control.

Examples of methods for detecting an output current of a switching power supply circuit include, for example, the following methods. A first method is a method in which a current detecting resistor is coupled to a secondary winding side of a transformer included in the switching power supply circuit and an output current is detected from a voltage applied to the resistor.

A second method is, for example, a method in which a current transformer circuit is coupled to a primary winding side of a transformer included in the switching power supply circuit and an output current is detected, based on an output voltage of the current transformer circuit.

When an output current of the switching power supply circuit is detected using a current detecting resistor, a loss is large, and therefore, a current transformer circuit with a small loss may be used.

However, when a current transformer circuit is used, due to the influence of a ripple of a switching current, there is a difference between an output current of the switching power supply circuit, which is detected in the current transformer circuit, and an actual output current. Therefore, there is a problem in which an overcurrent is not properly controlled.

The following are reference documents.
[Document 1] Japanese Laid-open Patent Publication No. 2014-119354,
[Document 2] Japanese Laid-open Patent Publication No. 2012-90406, and
[Document 3] Japanese Laid-open Patent Publication No. 2008-113476.

SUMMARY

According to an aspect of the invention, a control method for a switching power supply circuit, the control method causing a processor to execute a process, the process includes: calculating a differential value between an output voltage of the switching power supply circuit and a target voltage; multiplying the differential value by a first coefficient to calculate a correction value; correcting a first detection value of an output current of the switching power supply circuit, which is detected by a current transformer circuit, based on the correction value, to generate a second detection value; comparing the second detection value with a threshold current value to determine whether or not an overcurrent has occurred; and reducing, when it is determined that the overcurrent has occurred, the output voltage of the switching power supply circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present disclosure will be described below with reference the accompanying drawings.

First Embodiment

Figure 1:
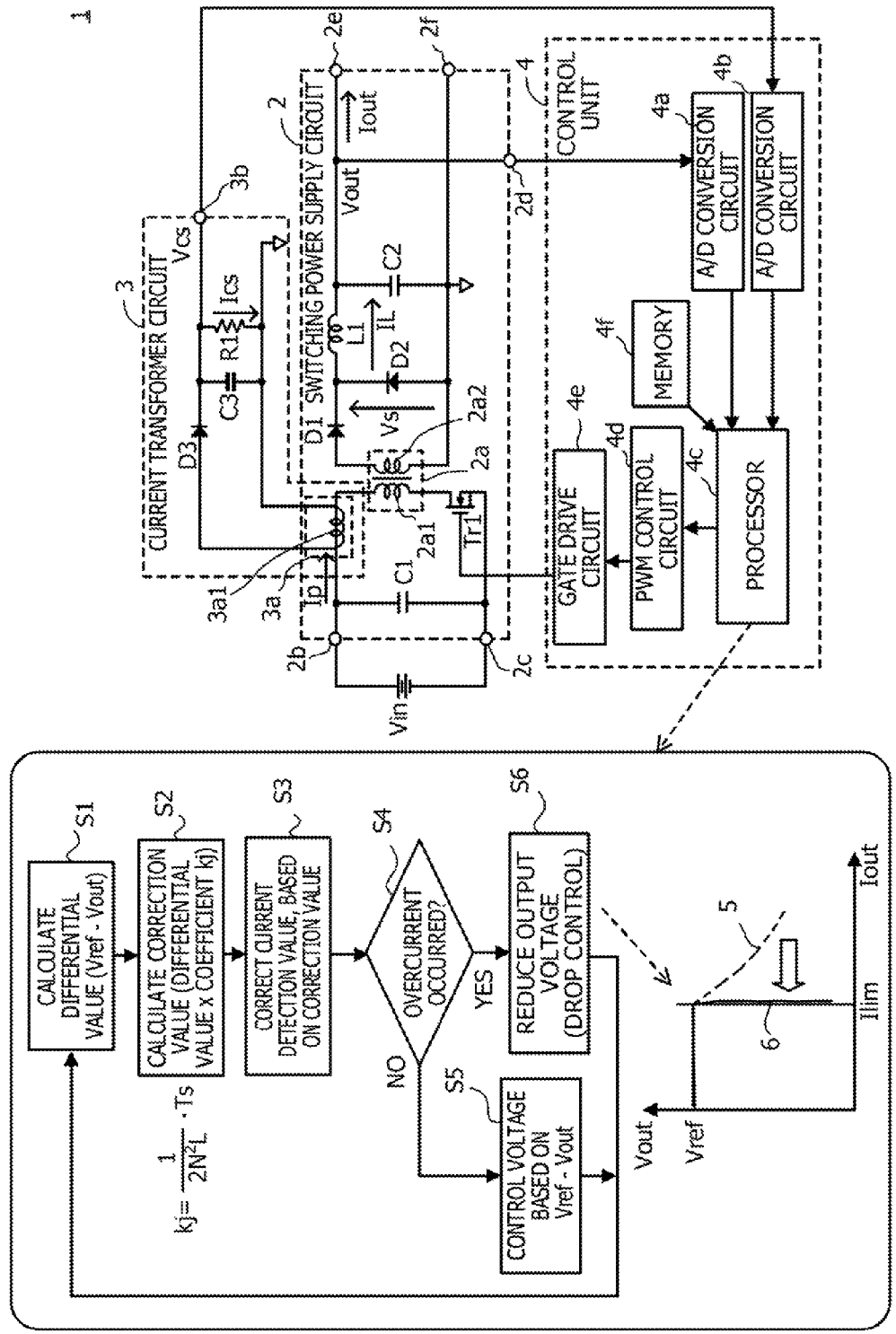
FIG. 1 is a diagram illustrating an example of a control method for a switching power supply circuit and a power supply device according to a first embodiment.

FIG. 1 is a diagram illustrating an example of a control method for a switching power supply circuit and a power supply device according to a first embodiment.

A power supply device 1 includes a switching power supply circuit 2, a current transformer circuit 3, and a control unit 4.

The switching power supply circuit 2 includes a capacitor C1, a transformer 2a, a transistor Tr1, diodes D1 and D2, an inductor L1, and a capacitor C2.

Both ends of the capacitor C1 are coupled to input terminals 2b and 2c. An input voltage (a direct current voltage) Vin is applied between the input terminals 2b and 2c. One end of a primary winding 2a1 of the transformer 2a is coupled to one end of the capacitor C1 and the other end of the primary winding 2a1 is coupled to the drain of the transistor Tr1 that is an n-channel type metal-oxide semiconductor field effect transistor (MOSFET). The source of the transistor Tr1 is coupled to the other end of the capacitor C1. The gate of the transistor Tr1 is coupled to the control unit 4. The transistor Tr1 functions as a switching transistor of the switching power supply circuit 2.

One end of a secondary winding 2a2 of the transformer 2a is coupled to the anode of the diode D1 and the other end of the secondary winding 2a2 is grounded. The cathodes of the diodes D1 and D2 are coupled to one end of the inductor L1 and the anode of the diode D2 is grounded. The other end of the inductor L1 is coupled to one end of the capacitor C2, an output terminal 2e, and a terminal 2d. The other end of the capacitor C2 is grounded. A load circuit (not illustrated) is coupled to the output terminals 2e and 2f. Note that the output terminal 2f is grounded. The terminal 2d is coupled to the control unit 4.

Note that, in the example of FIG. 1, the switching power supply circuit 2 of the forward converter type has been illustrated, but the switching power supply circuit 2 is not limited thereto and may be a switching power supply circuit of another type, such as the full bridge type or the like.

The current transformer circuit 3 includes a transformer 3a including a secondary winding 3a1, a diode D3, a capacitor C3, and a resistor R1.

The transformer 3a is disposed at a primary winding 2a1 side of the switching power supply circuit 2, one end of the secondary winding 3a1 is coupled to the anode of the diode D3, and the other end of the secondary winding 3a1 is grounded.

The cathode of the diode D3 is coupled to one end of the capacitor C3, one end of the resistor R1, and an output terminal 3b. The other end of the capacitor C3 and the other end of the resistor R1 are grounded. The output terminal 3b is coupled to the control unit 4.

The control unit 4 includes analog to digital (A/D) conversion circuits 4a and 4b, a processor 4c, a pulse width modulation (PWM) control circuit 4d, a gate drive circuit 4e, and memory 4f.

The A/D conversion circuit 4a is coupled to the terminal 2d of the switching power supply circuit 2 and converts an output voltage Vout of the switching power supply circuit 2 to a digital value.

The A/D conversion circuit 4b is coupled to the output terminal 3b of the current transformer circuit 3 and converts a current Ics corresponding to an output voltage Vcs that is output from the current transformer circuit 3 to detect an output current Iout of the switching power supply circuit 2 to a digital value.

The processor 4c is a central processing unit (CPU), a micro processing unit (MPU), an application specific integrated circuit (ASIC), a field programmable gate array (FPGA), or the like.

The processor 4c generates a control signal to control the PWM control circuit 4d, based on outputs of the A/D conversion circuits 4a and 4b, and outputs the generated control signal. Also, the processor 4c executes processing of Steps S1 to S5 illustrated in FIG. 1 to control the switching power supply circuit 2. Each processing of Steps S1 to S5 will be described later.

The PWM control circuit 4d generates a control signal to cause the gate drive circuit 4e to turn on or off the transistor Tr1 in a predetermined cycle, based on the control signal sent from the processor 4c, and outputs the generated control circuit.

The gate drive circuit 4e generates a gate voltage based on the control signal sent from the PWM control circuit 4d and applies the generated gate voltage to the gate of the transistor Tr1.

The memory 4f is, for example, flashes memory or the like and stores a program that is executed by the processor 4c and various types of data.

Among the above-described elements of the control unit 4, for example, each of the A/D conversion circuits 4a and 4b, the processor 4c, the PWM control circuit 4d, and the memory 4f may be realized by a microcontroller.

Before describing an operation of the power supply device 1, a reason why an error occurs between an output current of the switching power supply circuit 2, which is detected using the current transformer circuit 3, and the actual output current Iout will be described below.

Note that, in accordance with control of the PWM control circuit 4d, the transistor Tr1 is turned on or off in a cycle Ts and an on time is Ts×Duty (duty ratio).

A variation amount $\Delta V$'s of a voltage Vs at the secondary winding 2a2 side of the transformer 2a is represented by Expression 1 below.

$$\Delta Vs = Vin/N \quad \text{[Expression 1]}$$

Note that N denotes the ratio between the number N1 of turns of the primary winding 2a1 of the transformer 2a and the number N2 of turns of the secondary winding 2a2 of the transformer 2a and $N = N1/N2$ holds.

The variation amount $\Delta VS$ is the amount of variations in voltage at the both ends of the inductor L1, and therefore, a variation amount $\Delta IL$ of a current IL flowing through the inductor L1 is represented by Expression 2 below.

$$\Delta IL = \Delta Vs \cdot Ts \cdot Duty/L \quad \text{[Expression 2]}$$

Note that, in Expression 2, L denotes the inductance of the inductor L1.

In accordance with Expression 1, Expression 2 may be modified to Expression 3 below.

$$\Delta IL = (Vin/N) \cdot (1/L) \cdot Ts \cdot Duty \quad \text{[Expression 3]}$$

On the other hand, a variation amount $\Delta Ip$ of the current Ip (which will be hereinafter referred to as a switching current Ip) at the primary winding 2a1 side of the transformer 2a and the variation amount $\Delta IL$ of the current IL are in the relationship represented by Expression 4.

$$\Delta Ip = (1/N) \cdot \Delta IL \quad \text{[Expression 4]}$$

Expression 4 may be modified from Expression 3 to Expression 5 below.

$$\Delta Ip = (1/N^2 L) \cdot Ts \cdot Duty \cdot Vin \quad \text{[Expression 5]}$$

Vin·Duty=Vout holds, and therefore, Expression 5 may be represented as Expression 6.

$$\Delta Ip = (1/N^2 L) \cdot Ts \cdot Vout \quad \text{[Expression 6]}$$

Figure 2:
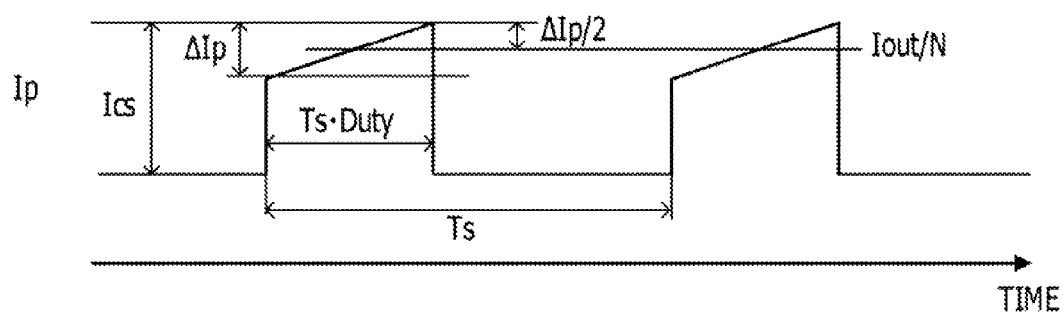
FIG. 2 is a chart illustrating the relationship between a switching current and an output current.

In this case, the relationship between the switching current Ip and the output current Iout may be as illustrated in FIG. 2.

FIG. 2 is a chart illustrating the relationship between a switching current and an output current.

In FIG. 2, the abscissa axis indicates time.

The switching current Ip cyclically rises to the high (H) level, but the value of the H level does not stay at a certain level and tends to increase with time, and the waveform of the switching current Ip includes a ripple.

A value obtained by dividing the output current Iout by the ratio N between the numbers of turns is smaller than a peak value of the switching current Ip only by $\Delta$Ip/2.

On the other hand, the current Ics flowing through the resistor R1 of the current transformer circuit 3 is the peak value of the switching current Ip due to an influence of the capacitor C3.

Therefore, the relationship between the current Ics and the output current Iout is represented by Expression 7.

$$Ics = (\Delta Ip/2) + (Iout/N) = (1/2N^2L) \cdot Ts \cdot Vout + (Iout/N) \quad \text{[Expression 7]}$$

Expression 7 is represented by Expression 8 below.

$$Iout/N = Ics - (1/2N^2L) \cdot Ts \cdot Vout \quad \text{[Expression 8]}$$

In Expression 8, assuming Idev=$(1/2N^2L) \cdot Ts \cdot Vout$, Expression 8 is represented by Expression 9 below.

$$Iout = N(Ics - Idev) \quad \text{[Expression 9]}$$

Note that, in the current transformer circuit 3, when the output voltage Vout=a target voltage Vref holds, an offset is added such that Idev=0 is satisfied. Therefore, Idev=$(1/2N^2L) \cdot Ts \cdot (Vref-Vout)$ may be caused to be satisfied. That is, Idev depends on Vref−Vout.

Assume that NIcs is a current detection value of the output current Iout when the current transformer circuit 3 is used, the current detection value N·Ics differs from the actual output current Iout by N·Idev.

Therefore, the processor 4c of the power supply device 1 according to this embodiment corrects the current detection value N·Ics, based on Expression 9, and obtains a current detection value (which will be hereinafter referred to as a current detection value Idout) that is equal to the actual output current Iout.

The operation of the power supply device 1 and a control method for the switching power supply circuit 2 using the processor 4c will be described below with reference to FIG. 1.

Step S1: The processor 4c calculates a differential value (Vref−Vout) between the output voltage Vout and the target voltage Vref.

Step S2: The processor 4c multiplies the calculated differential value by a coefficient kj that has been calculated in advance to calculate a correction value (kj·(Vref−Vout)). The coefficient kj is $(1/2N^2L) \cdot Ts$. The coefficient kj is stored in a register (not illustrated) in the memory 4f or the processor 4c in advance.

Note that, assuming that, in this case, the inductance L and the cycle Ts are fixed, the description is given (a case where the inductor L and the cycle Ts vary will be described later).

Step S3: The processor 4c corrects the current detection value N·Ics based on the calculated correction value. The processor 4c deducts a value obtained by multiplying the above-described correction value by the ratio N between the numbers of turns from the current detection value N·Ics, thereby calculating the current detection value Idout corresponding to the output current Iout.

Step S4: The processor 4c compares the current detection value Idout calculated in processing of Step S3 with a threshold current value Ilim that is an upper limit of the output current Iout and determines whether or not an overcurrent has occurred. For example, if the current detection value Idout exceeds the threshold current value Ilim, the processor 4c determines that an overcurrent has occurred.

Step S5: If the processor 4c determines that an overcurrent has not occurred, the processor 4c controls, based on Vref−Vout, the PWM control circuit 4d such that the output voltage Vout approximates the target voltage Vref.

Step S6: If the processor 4c determines that an overcurrent has occurred, the processor 4c outputs a control signal to reduce the output voltage Vout to the PWM control circuit 4d. Thus, drop control is performed.

After the processing of Steps S5 and S6, the processing from Step S1 is repeated.

In FIG. 1, an example of drop control is illustrated. In FIG. 1, the abscissa axis indicates the output current Iout and the ordinate axis indicates the output voltage Vout.

A waveform 5 represented by a broken line indicates the relationship between the output voltage Vout and the output current Iout when the processor 4c does not take Idev into consideration. A waveform 6 represented by a solid line indicates the relationship between the output voltage Vout and the output current Iout when the processor 4c performed control in consideration of Idev, as described above.

As described above, Idev=$(1/2N^2L) \cdot Ts \cdot Vout$ holds, and therefore, as the output voltage Vout reduces, Idev reduces. Also, based on Expression 9, as Idev reduces, the output current Iout increases.

If such Idev is not taken into consideration, as the output voltage Vout reduces, the output current Iout is estimated to be smaller than an actual output current Iout, and therefore, it is determined earlier than in an actual case that the output current Iout is lower than the threshold current value Ilim, so that control to reduce the output voltage Vout is stopped. Therefore, as indicated by the waveform 5, an overcurrent occurs.

In contrast, in the power supply device 1 and the control method for the switching power supply circuit 2 according to this embodiment, the current detection value N·Ics is corrected based on a value (Idev) obtained by multiplying a difference between the output voltage Vout and the target voltage Vref by the coefficient kj. Thus, the above-described detection error depending on the difference between the output voltage Vout and the target voltage Vref, that is, a variation in the output voltage Vout, may be reduced.

Thus, as indicated by the waveform 6, when the output current Iout reaches the threshold current value Ilim, the output voltage Vout is reduced and the occurrence of an overcurrent is reduced.

Note that the function of the processor 4c that performs the above-described processing may be illustrated, for example, by a functional block below.

Figure 3:
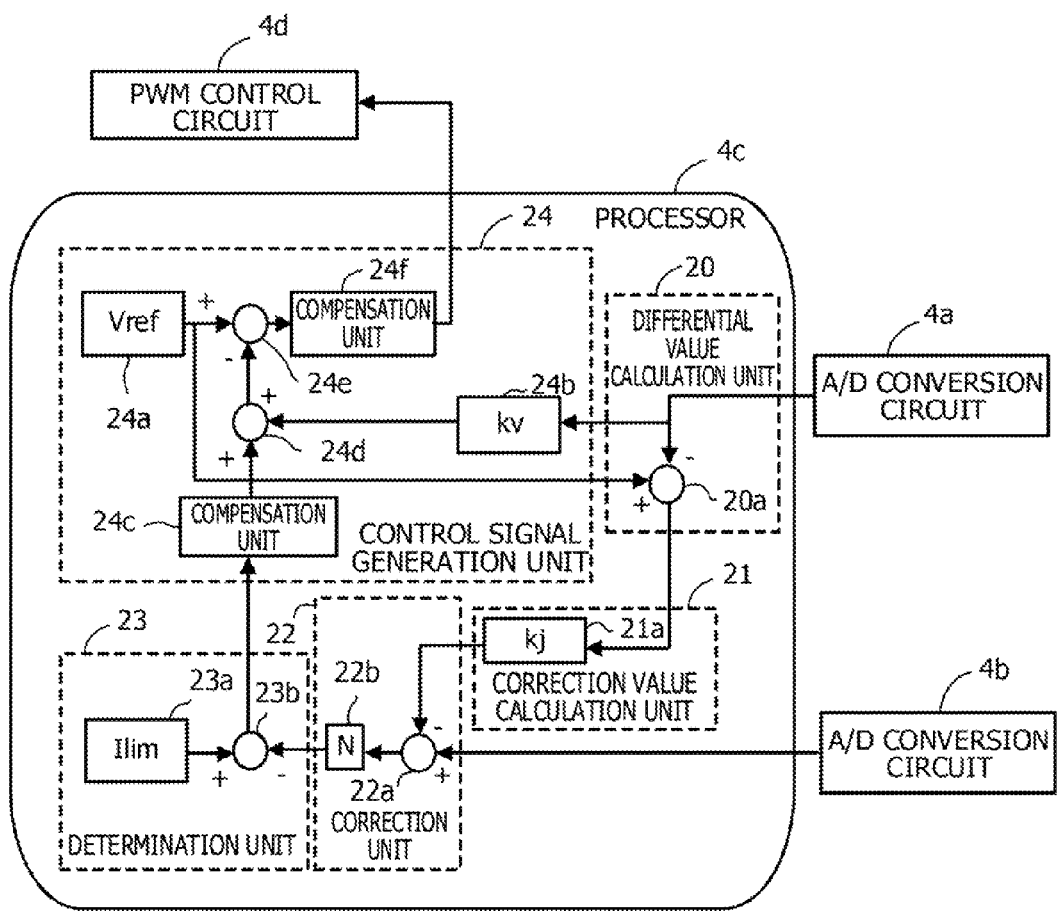
FIG. 3 is a diagram illustrating an example of functional blocks exhibiting functions that are realized by a processor.

FIG. 3 is a diagram illustrating an example of functional blocks exhibiting functions that are realized by a processor.

The processor 4c realizes the functions of a differential value calculation unit 20, a correction value calculation unit 21, a correction unit 22, a determination unit 23, and a control signal generation unit 24, which are illustrated in FIG. 3, based on data and a program stored in the memory 4f.

The differential value calculation unit 20 is a functional block that performs the processing of Step S1 of FIG. 1. The differential value calculation unit 20 includes a deduction unit 20a. The deduction unit 20a outputs a differential value between a digital value corresponding to the target voltage Vref and a digital value corresponding to the output voltage Vout of the switching power supply circuit 2.

The correction value calculation unit 21 is a functional block that performs the processing of Step S2 of FIG. 1. The correction value calculation unit 21 includes a multiplication unit 21a. The multiplication unit 21a multiplies the differential value calculated by the differential value calculation unit 20 by the above-described coefficient kj, thereby calculating a correction value.

The correction unit 22 is a functional block that performs the processing of Step S3 of FIG. 1. The correction unit 22 includes a deduction unit 22a and a multiplication unit 22b. The deduction unit 22a deducts the correction value calculated by the correction value calculation unit 21 from a digital value corresponding to the current Ics output from the A/D conversion circuit 4b. The multiplication unit 22b multiplies a result of deduction performed by the deduction unit 22a by the ratio N between the numbers of turns, thereby generating a digital value corresponding to the above-described current detection value Idout.

The determination unit 23 is a functional block that performs the processing of Step S4 of FIG. 1. The determination unit 23 includes a threshold current value holding unit 23a and a deduction unit 23b. The threshold current value holding unit 23a holds a digital value corresponding to the above-described threshold current value Ilim. The deduction unit 23b deducts a digital value corresponding to the current detection value Idout generated by the correction unit 22 from a digital value corresponding to the threshold current value Ilim. If a result of deduction performed by the deduction unit 23b is a positive value, it is indicated that an overcurrent has not occurred and, if the result of deduction is a negative value, it is indicated that an overcurrent has occurred.

The control signal generation unit 24 is a functional block that performs the processing of Step S5 and S6 of FIG. 1. The control signal generation unit 24 includes a target voltage value holding unit 24a, a multiplication unit 24b, a compensation unit 24c, an addition unit 24d, a deduction unit 24e, and a compensation unit 24f.

The target voltage value holding unit 24a holds a digital value corresponding to the above-described target voltage Vref.

The multiplication unit 24b multiplies a digital value corresponding to the output voltage Vout by a coefficient kv and performs gain adjustment. Note that the multiplication unit 24b may be omitted.

When a value indicating the occurrence of an overcurrent is output from the determination unit 23, the compensation unit 24c generates a correction value to reduce the output voltage Vout.

The addition unit 24d adds the correction value output from the compensation unit 24c and a value output from the multiplication unit 24b together.

The deduction unit 24e deducts a result of addition performed by the addition unit 24d from a digital value corresponding to the target voltage Vref.

The compensation unit 24f correct, based on a result of deduction performed by the deduction unit 24e, a control signal that is supplied to the PWM control circuit 4d and outputs the corrected control signal.

In the control signal generation unit 24, if a value indicating the occurrence of an overcurrent has not been output from the determination unit 23, the compensation unit 24f corrects, based on an output of the deduction unit 24e, the control signal such that the output voltage Vout is the target voltage Vref. Thus, for example, if the output voltage Vout is larger than the target voltage Vref, control to reduce the output voltage Vout is performed and, if the output voltage Vout is smaller than the target voltage Vref, control to increase the output voltage Vout is performed.

On the other hand, if a value indicating the occurrence of an overcurrent has been output from the determination unit 23, the output of the addition unit 24d is increased and, in the compensation unit 24f, even when the output voltage Vout is the target voltage Vref, a control signal to reduce the output voltage Vout is generated. Thus, drop control in which the output voltage Vout is reduced is performed.

Figure 4:
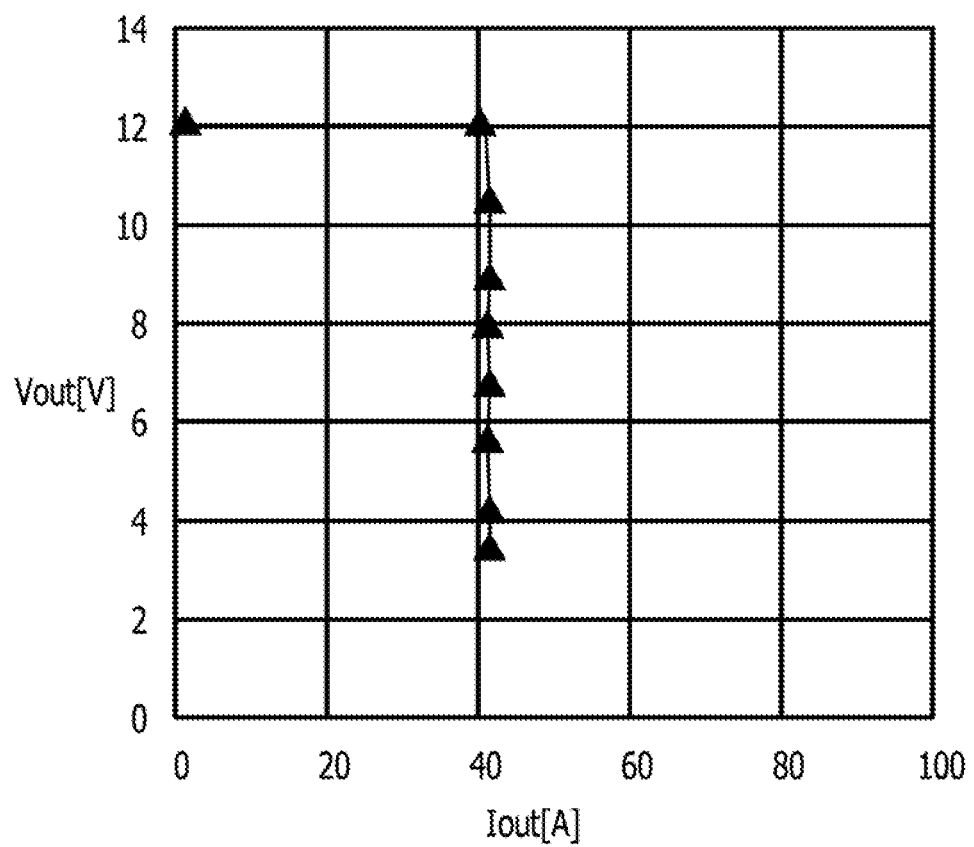
FIG. 4 is a graph illustrating an example of results of simulation of drop control in accordance with a control method for a switching power supply circuit according to the first embodiment.

FIG. 4 is a graph illustrating an example of results of simulation of drop control in accordance with a control method for a switching power supply circuit according to the first embodiment.

In FIG. 4, the abscissa axis indicates the output current Iout and the ordinate axis indicates the output voltage Vout. Also, the target voltage Vref is 12 V, the coefficient kj is 0.3, and the threshold current value Ilim is 41.7 A.

As illustrated in FIG. 4, it is understood that, when the output current Iout reached the threshold current value Ilim, the output voltage Vout was reduced and a proper drop characteristic was achieved.

Figure 5:
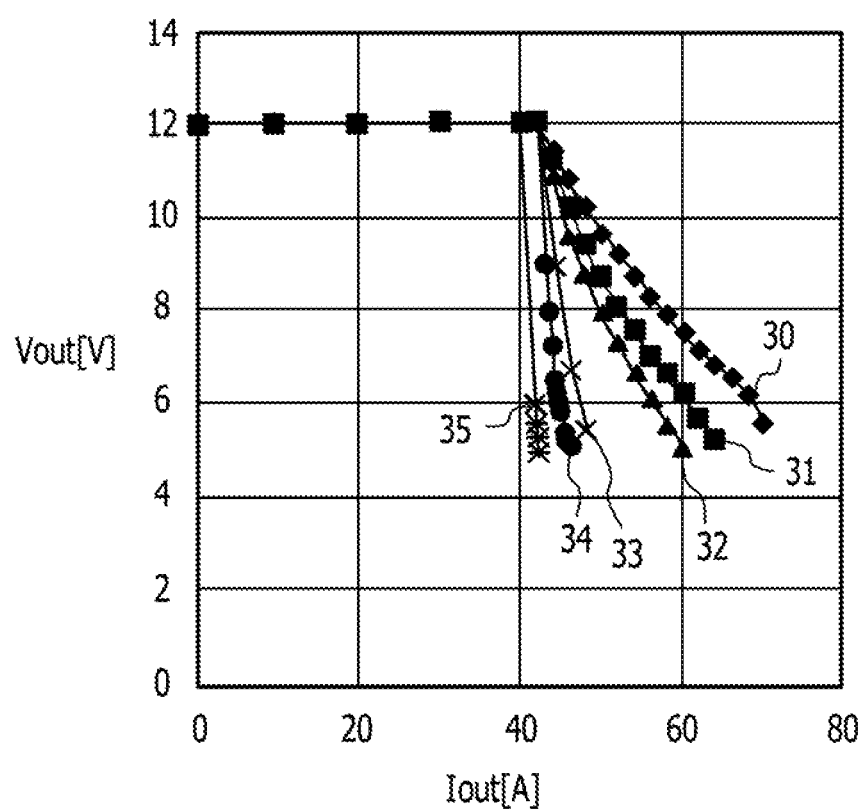
FIG. 5 is a graph illustrating results of an example of experiment of drop control in accordance with a control method for a switching power supply circuit according to the first embodiment.

FIG. 5 is a graph illustrating an example of results of experiment of drop control in accordance with a control method for a switching power supply circuit according to this embodiment.

In FIG. 5, the abscissa axis indicates the output current Iout and the ordinate axis indicates the output voltage Vout. Note that, as a switching power supply circuit, not the switching power supply circuit of the forward converter type illustrated in FIG. 1 but a switching power supply circuit of the full bridge converter type of which the power supply capacity is 500 W was used. Also, the input voltage Vin is 400 V, the threshold current value Ilim is 41.7 A, the switching frequency is 100 kHz, the target voltage Vref is 12 V, and the coefficient kj is 0.16 to 0.47.

Among a plurality of characteristics 30 to 35 illustrated in FIG. 5, the characteristic 30 indicates a drop characteristic when the above-described Idev is not taken into consideration. Also, the characteristic 31 indicates a drop characteristic when the coefficient kj is 0.16, the characteristic 32 indicates a drop characteristic when the coefficient kj is 0.23, the characteristic 33 indicates a drop characteristic when the coefficient kj is 0.40, the characteristic 34 indicates a drop characteristic when the coefficient kj is 0.42, and the characteristic 35 indicates a drop characteristic when the coefficient kj is 0.47.

As illustrated in FIG. 5, it is understood that, as the coefficient kj is increased, an overcurrent is further reduced.

Incidentally, in Expression 9 described above, the input voltage Vin is not included. That is, the current detection value Idout corresponding to the output current Iout is calculated based on the current Ics of the current transformer circuit 3, and therefore, measurement of the input voltage Vin may be advantageously omitted.

As described above, Vin·Duty=Vout holds, even when the input voltage Vin varies, the duty ratio Duty varies in an inversely proportional manner by feedback, and therefore, the output voltage Vout does not vary. Therefore, if the output voltage Vout is measured in advance, the current detection value N·Ics may be corrected.

Also, the coefficient kj is determined regardless of the target voltage Vref, and therefore, even when the target voltage Vref is changed, it is not desired to change the coefficient kj.

Second Embodiment

In a control method for a switching power supply circuit according to the first embodiment, the inductance L of the inductor L1 is fixed but there is a probability that the inductance L varies due to environmental temperature and a current flowing through the inductor L1. The coefficient kj is $(1/2N^2L) \cdot Ts$, and therefore, there is a probability that, if the coefficient kj is not changed in accordance with the variation in the inductance L, the accuracy of calculation of the output current Iout is reduced.

Thus, in a control method for a switching power supply circuit according to a second embodiment, the processor 4c determines the inductance L in accordance with environmental temperature and a current flowing through the inductor L1 and calculates the coefficient kj, based on the inductance L.

Figure 6:
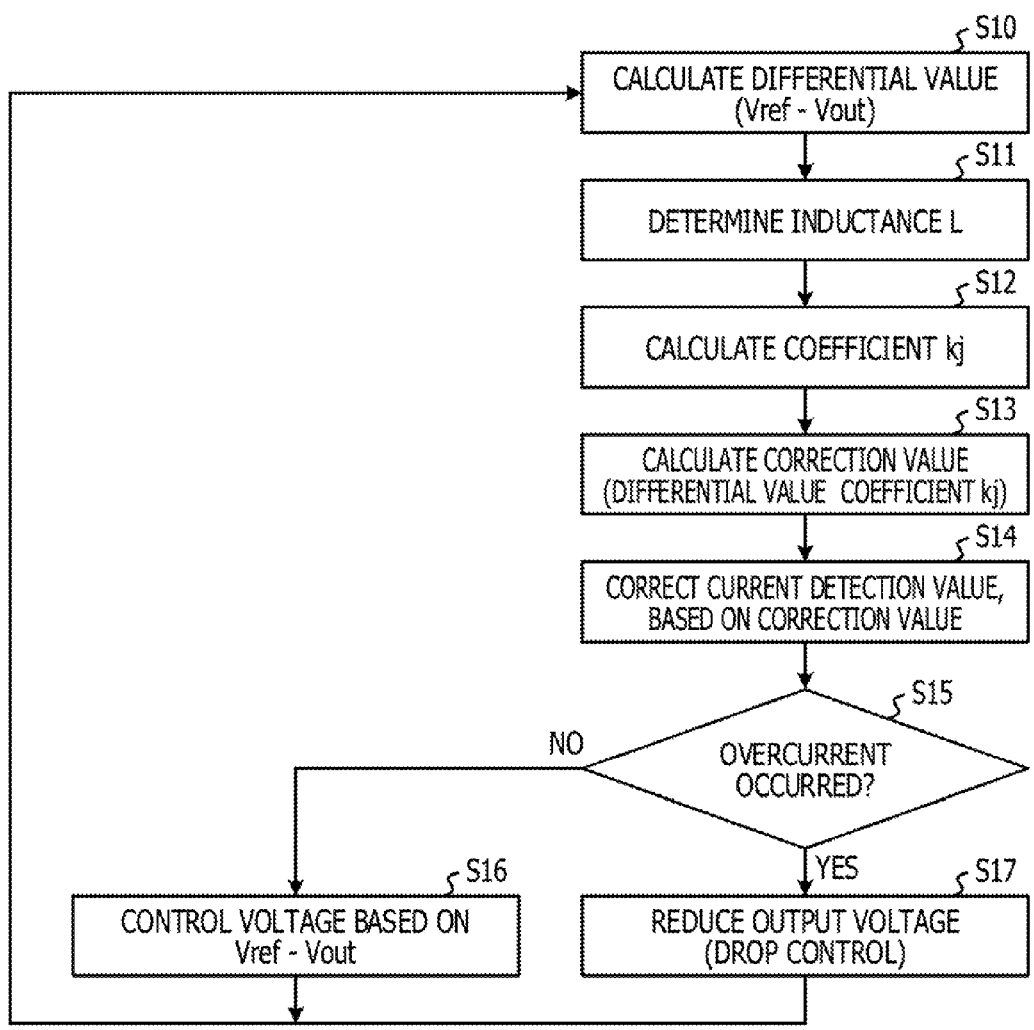
FIG. 6 is a flow chart illustrating a flow of processing of an example of a control method for a switching power supply circuit according to a second embodiment.

FIG. 6 is a flow chart illustrating a flow of processing of an example of a control method for a switching power supply circuit according to the second embodiment.

Note that each processing below will be described, assuming that the processing is performed in a similar circuit configuration to that of the power supply device 1 illustrated in FIG. 1.

Processing of Step S10 is the same processing as the processing of Step S1 illustrated in FIG. 1. After the processing of Step S10, the processor 4c determines the inductance L of the inductor L1 of the switching power supply circuit 2 in processing of Step S11.

Figure 7:
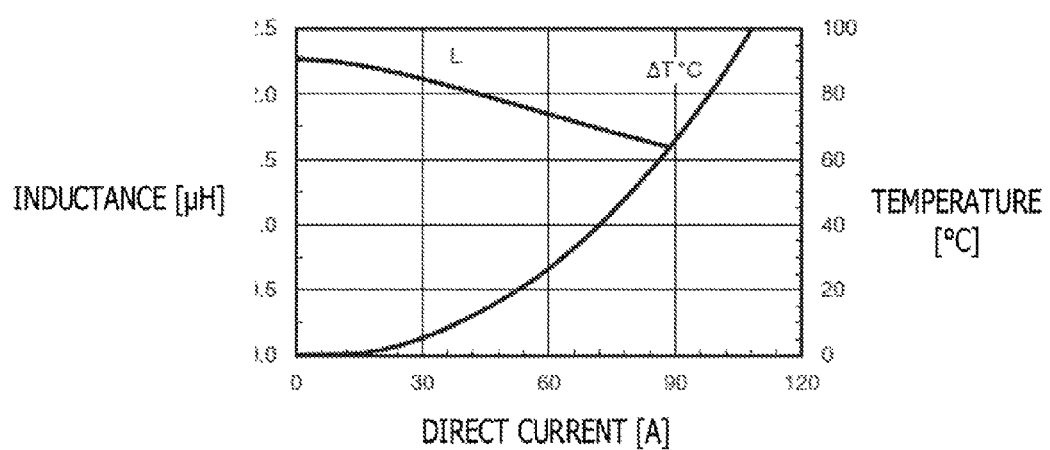
FIG. 7 is a graph illustrating an example of characteristics of an inductor.

FIG. 7 is a graph illustrating an example of characteristics of an inductor.

In FIG. 7, the abscissa axis indicates a direct current [A] and the ordinate axes indicate an inductance [μh] and temperature [° C.].

The inductance L of the inductor L1 indicates, for example, as illustrated in FIG. 7, a characteristic (a direct current superposition characteristic) in which, when a direct current flowing through the inductor L1 is large, the inductance L reduces. Also, when a direct current is large, the temperature variation $\Delta T°$ C. of the inductor L1 increases.

Figure 8:
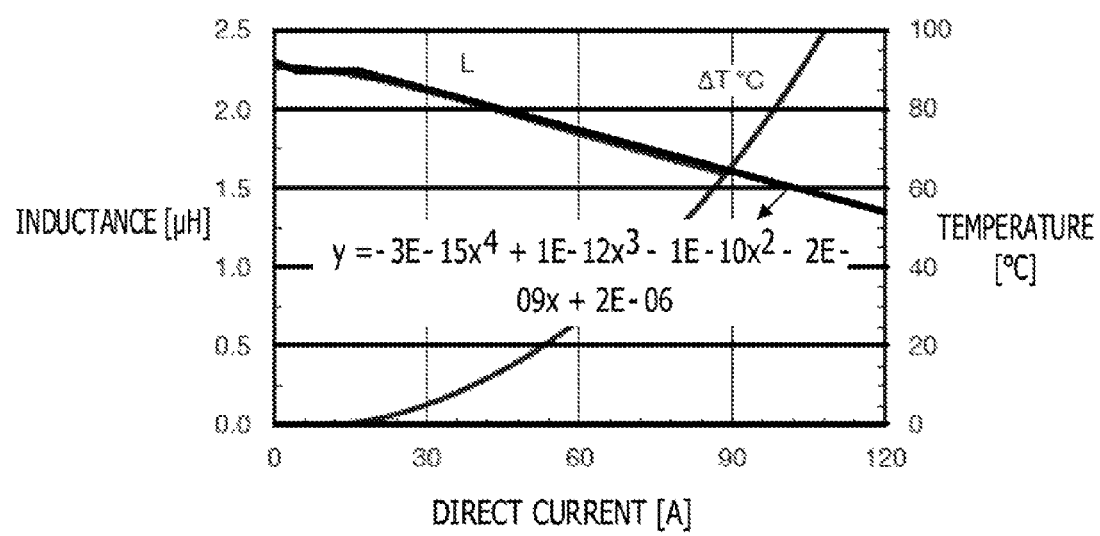
FIG. 8 is a graph illustrating an example of an approximate curve illustrating the relationship between an inductance and a direct current.
Figure 9:
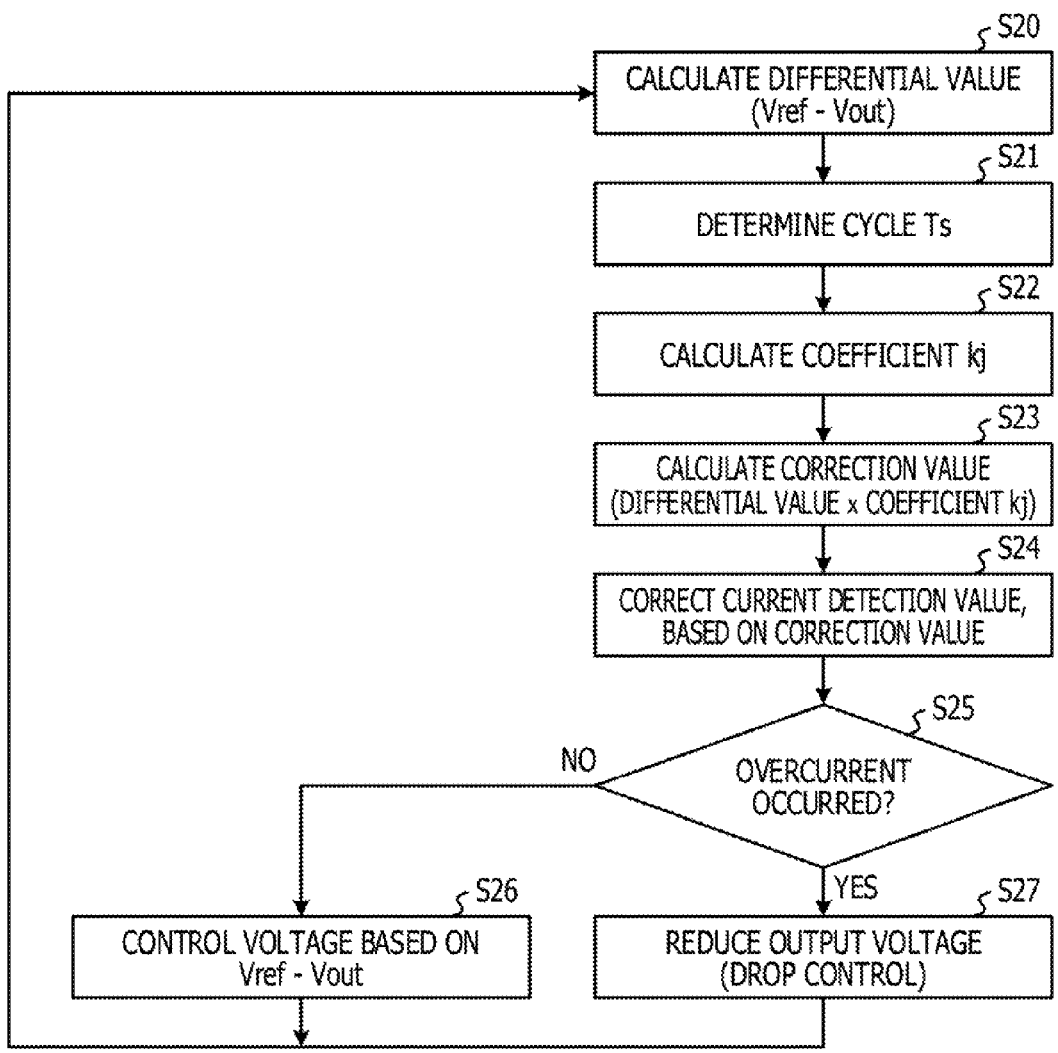
FIG. 9 is a flow chart illustrating a flow of processing of an example of a control method for a switching power supply circuit according to a third embodiment.

FIG. 8 is a graph illustrating an example of an approximate curve illustrating the relationship between an inductance and a direct current.

FIG. 8 illustrates an example of an approximate curve of the characteristic of the inductance L in the inductor L1 illustrated in FIG. 7. The approximate curve is represented by an expression $y=-3E-15x^4+1E-12x^3-1E-10x^2-2E-09x+2E-06$.

The processor 4c calculates, for example, based on an immediately preceding calculation result of the current detection value Idout, a direct current flowing through the inductor L1, substitutes the direct current for x in the expression representing the approximate curve to calculate y, that is, the inductance L.

Also, a configuration in which the relationship between the direct current and the inductance L based on the approximate curve is stored as table data, for example, in the memory 4f in advance may be employed. In that case, the processor 4c calculates a direct current flowing through the inductor L1, based on an immediately preceding calculation result of the current detection value Idout, and selects the inductance L corresponding to the direct current from the table data. When the table data is used, a processing time is reduced to a shorter time than that when the processor 4c calculates the inductance L using the expression representing the approximate curve.

Note that there is a tendency that, when the environmental temperature rises, the inductance L increases, and therefore, the processor 4c may be configured to determine the inductance L, based on the relationship between the environmental temperature and the inductance L.

When the processor 4c determines the inductance L in the above-described manner, the processor 4c calculates the coefficient kj using the inductance L in processing of Step S12.

Subsequent processing of Steps S13 to S17 is the same as the processing of Steps S2 to S6 in FIG. 1.

Using the above-described control method for a switching power supply circuit, even when the inductance L varies depending on a use condition of the power supply device 1, the processor 4c determines the inductance L and calculates the coefficient kj, based on the inductance L. Thus, reduction of the accuracy of detection of the output current Iout may be reduced.

Third Embodiment

In the control methods for a switching power supply circuit according to the first and second embodiments, the cycle Ts is fixed but, when the power supply device 1 is a power supply device that operates in accordance with a frequency modulation system (an LLC power supply circuit system, an artificial resonance system, or the like), the cycle Ts varies. The coefficient kj is $(1/2N^2L) \cdot Ts$, and therefore, there is a probability that, if the coefficient kj is not changed in accordance with the cycle Ts, the accuracy of calculation of the output current Iout is reduced.

Thus, in a control method for a switching power supply circuit according to a third embodiment, which will be described below, the processor 4c determines the cycle Ts and calculates the coefficient kj, based on the cycle Ts.

FIG. is a flow chart illustrating a flow of processing of an example of a control method for a switching power supply circuit according to the third embodiment.

Note that each processing below will be described, assuming that the processing is performed based on control performed by the processor 4c of the power supply device 1 illustrated in FIG. 1.

Processing of Step S20 is the same as the processing of Step S1 illustrated in FIG. 1. After the processing of Step S20, the processor 4c determines the cycle Is in processing of Step S21.

Figure 10:
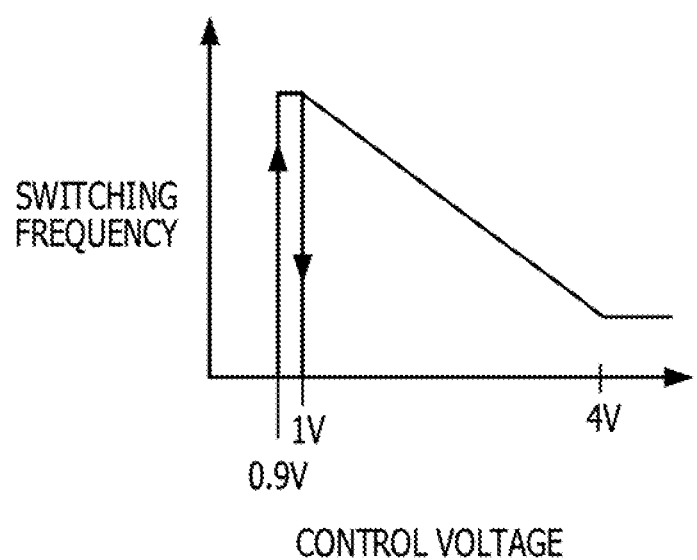
FIG. 10 is a graph illustrating an example of the relationship between a switching frequency of a power supply device of a frequency modulation system and a control voltage.

FIG. 10 is a graph illustrating an example of the relationship between a switching frequency of a power supply device of a frequency modulation system and a control voltage.

In FIG. 10, the abscissa axis indicates a control voltage (the voltage of a control signal output from the compensation unit 24f of FIG. 3) and the ordinate axis indicates a switching frequency.

When the control voltage increases, the switching frequency (the inverse number of the cycle Ts) reduces. The processor 4c determines the cycle Ts, for example, based on the characteristic illustrated in FIG. 10.

When the processor 4c determines the cycle Ts in the above-described manner, the processor 4c calculates the coefficient kj, based on the cycle Ts, in processing of Step S22.

Subsequent processing of Steps S23 to S27 is the same as the processing of Steps S2 to S6 of FIG. 1.

Using the above-described control method for a switching power supply circuit, even when the switching frequency is changed, the processor 4c calculates the coefficient kj, and thereby, reduction of the accuracy of detection of the output current Iout may be reduced.

Note that, similar to the control method for a switching power supply circuit according to the second embodiment, the processor 4c may be configured to determine the inductance L and calculate the coefficient kj, based on the determined inductance L and the cycle Ts.

Modified Example

Incidentally, at least a part of the function of the processor 4c illustrated in FIG. 3 may be realized by a circuit.

Figure 11:
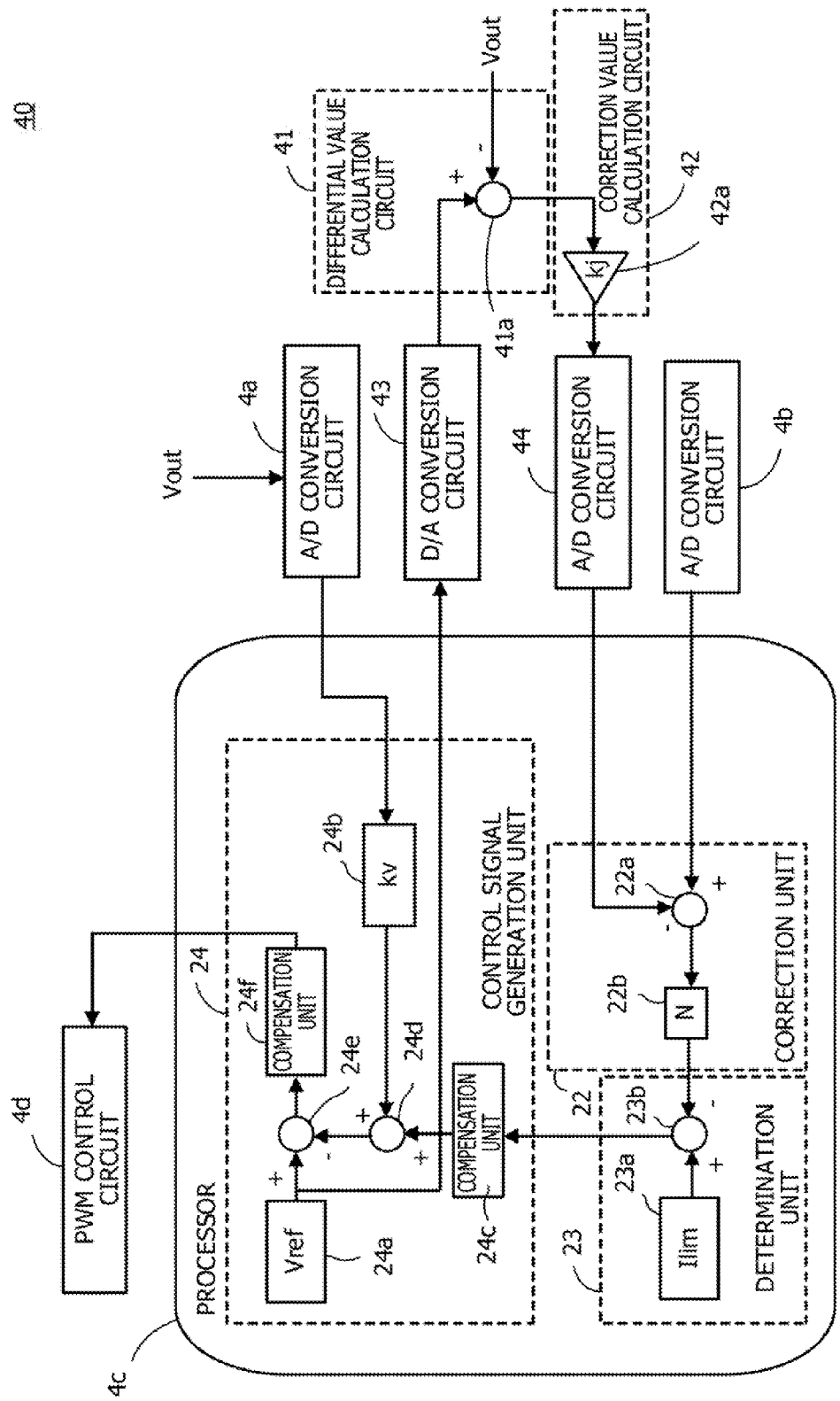
FIG. 11 is a diagram illustrating an example of a power supply device in which a differential value calculation function and a correction value calculation function are realized by circuits.

FIG. 11 is a diagram illustrating an example of a power supply device in which a differential value calculation function and a correction value calculation function are realized by circuits.

In FIG. 11, the processor 4c and a peripheral part thereof are illustrated. Each element which is the same as the corresponding element in FIG. 1 and FIG. 3 is denoted by the same reference numeral as that of the corresponding element in FIG. 1 and FIG. 3. Note that the illustration of the switching power supply circuit 2 and the current transformer circuit 3 illustrated in FIG. 1 is omitted.

The differential value calculation unit 20 and the correction value calculation unit 21 illustrated in FIG. 3 are realized as a differential value calculation circuit 41 and a correction value calculation circuit 42 in an example of a power supply device 40 illustrated in FIG. 11.

Also, the power supply device 40 further includes a digital to analog (D/A) conversion circuit 43 that converts the digital value of the target voltage Vref output from the processor 4c to an analog value and an A/D conversion circuit 44 that converts a correction value (an analog value) calculated by the correction value calculation circuit 42 to a digital value.

The differential value calculation circuit 41 includes a deduction unit 41a that deducts an output value Vo from the target voltage Vref. Also, the correction value calculation circuit 42 includes a multiplication unit 42a that multiplies a differential value calculated by the differential value calculation circuit 41 by the coefficient kj.

The differential value calculation circuit 41 and the correction value calculation circuit 42, which have been described above, may be realized, for example, by an operation circuit below.

Figure 12:
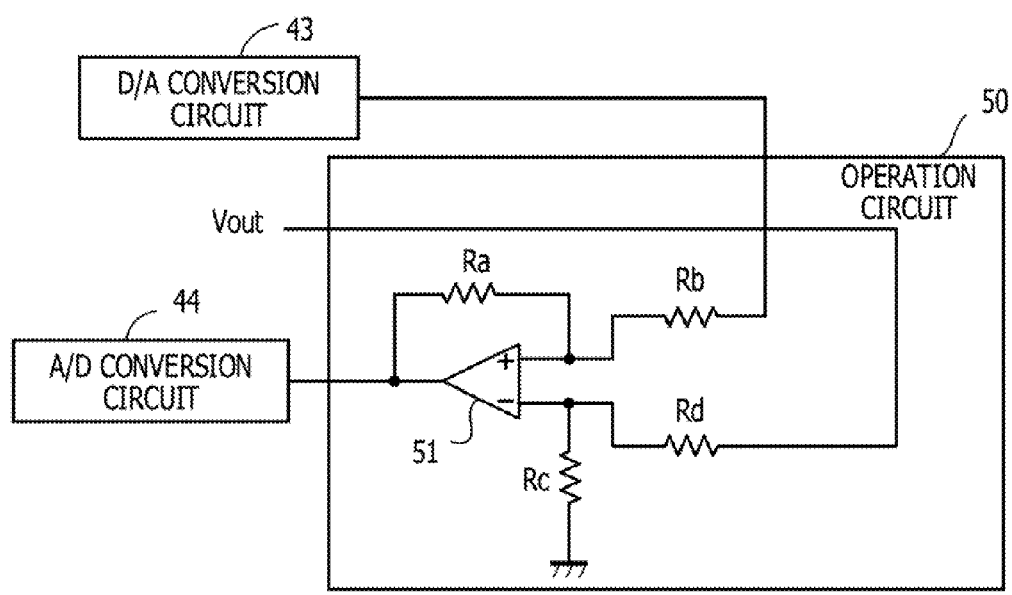
FIG. 12 is a diagram illustrating an example of an operation circuit that realizes functions of a differential value calculation circuit and a correction value calculation function.

FIG. 12 is a diagram illustrating an example of an operation circuit that realizes functions of a differential value calculation circuit and a correction value calculation function.

An operation circuit 50 includes resistors Ra, Rb, Rc and Rd and a differential amplification circuit 51.

One end of the resistor Ra is coupled to the non-inverted input terminal (a terminal denoted by "+") of the differential amplification circuit 51 and the other end of the resistor Ra is coupled to the output terminal of the differential amplification circuit 51.

One end of the resistor Rb is coupled to the output terminal of a D/A conversion circuit 43 and the other end of the resistor Rb is coupled to the non-inverted input terminal of the differential amplification circuit 51.

One of the resistor Rc is coupled to the inverted input terminal (a terminal denoted by "−") of the differential amplification circuit 51 and the other end of the resistor Rc is grounded.

The terminal 2d of the switching power supply circuit 2 illustrated in FIG. 1 is coupled to one end of the resistor Rd and the output voltage Vout is applied to the one end of the resistor Rd. The other end of the resistor Rd is coupled to the inverted input terminal of the differential amplification circuit 51.

The resistance values of the resistors Ra and Rc are equal to each other and the resistance values of the resistors Rb and Rd are equal to each other. The above-described coefficient kj may be set in accordance with kj=the resistance value of the resistor Ra/the resistance value of the resistor Rb.

The differential amplification circuit 51 amplifies a difference between a signal input to the non-inverted input terminal and a signal input to the inverted input terminal by kj times and outputs the amplified difference. The output signal of the differential amplification circuit 51 is converted to a digital value by an A/D conversion circuit 44 and is supplied to the processor 4c.

Thus, also, in the power supply device 40, similar advantages to those of the power supply device 1 may be achieved.

Note that, in the functional blocks illustrated in FIG. 3, a functional block other than the differential value calculation unit 20 and the correction value calculation unit 21 may be realized by a circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A control method for a switching power supply circuit, the control method causing a processor to execute a process, the process comprising:
   calculating a differential value between an output voltage of the switching power supply circuit and a target voltage;
   multiplying the differential value by a first coefficient to calculate a correction value;
   correcting a first detection value of an output current of the switching power supply circuit, which is detected by a current transformer circuit, based on the correction value, to generate a second detection value;
   comparing the second detection value with a threshold current value to determine whether or not an overcurrent has occurred; and
   reducing, when it is determined that the overcurrent has occurred, the output voltage of the switching power supply circuit.
2. The control method for a switching power supply circuit according to claim 1,
   wherein the first coefficient is a value based on the ratio between the numbers of turns of a primary winding and a secondary winding of a transformer included in the switching power supply circuit, the inductance of an inductor coupled to a secondary winding side, and a cycle in which a switching transistor included in the switching power supply circuit is turned on or off.
3. The control method for a switching power supply circuit according to claim 2,
   wherein the processor determines the inductance, based on a direct current superimposition characteristic or a temperature characteristic of the inductor, and calculates the first coefficient, based on the determined inductance.
4. The control method for a switching power; supply circuit according to claim 2, wherein the processor determines the cycle, based on a control voltage of the switching transistor, and calculates the first coefficient based on the determined cycle.

5. A power supply device comprising:

a switching power supply circuit;

a current transformer circuit that detects an output current of the switching power supply circuit; and a control unit that calculates a differential value between an output voltage of the switching power supply circuit and a target voltage, multiplies the differential value by a first coefficient to calculate a correction value, corrects a first detection value of the output current that is detected by the current transformer circuit, based on the correction value, to generate a second detection value, determining, based on comparison between the second detection value and a threshold current value, whether or not an overcurrent has occurred, and reduces, when it is determined that the overcurrent has occurred, the output voltage of the switching power supply circuit.

* * * * *